Dec. 14, 1937.  W. CARPENDER  2,101,983
FAN ECONOMIZER
Filed Aug. 8, 1934
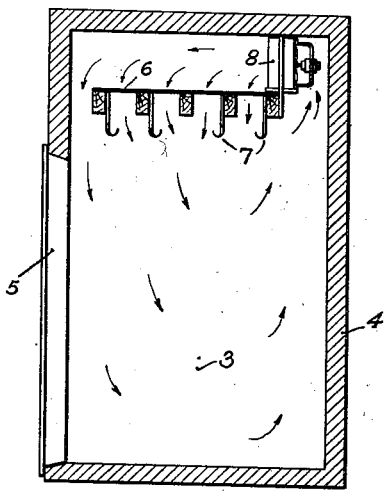
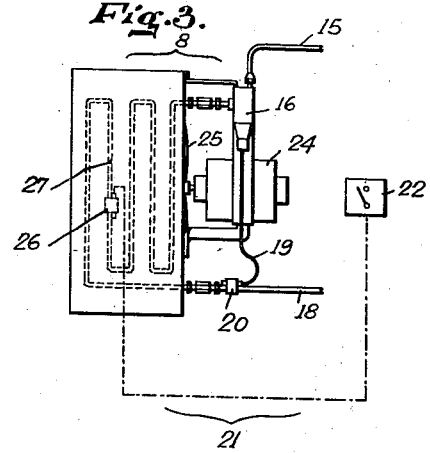
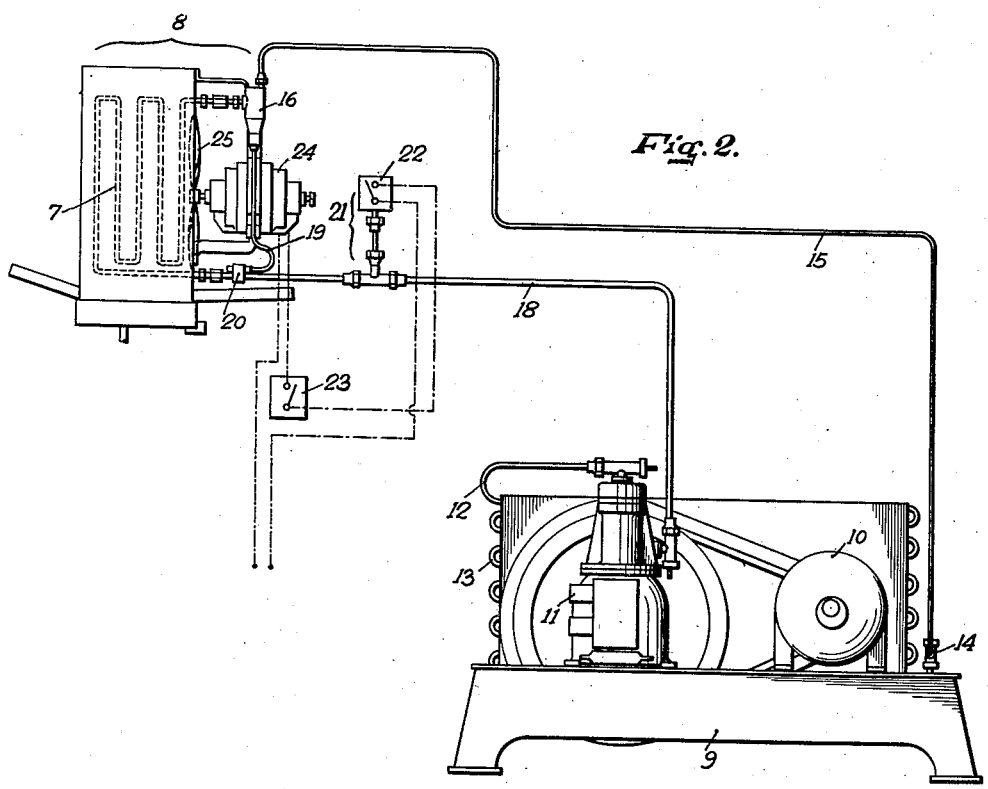
INVENTOR
William Carpender
BY
ATTORNEY Patented Dec. 14, 1937

2,101,983

UNITED STATES PATENT OFFICE 2,101,983

FAN ECONOMIZER

William Carpender, New Brunswick, N. J., assignor, by mesne assignments, to Carrier Corporation, Newark, N. J., a corporation of Delaware

REISSUED

Application August 8, 1934, Serial No. 738,950

8 Claims. (Cl. 62—4)

This invention relates to systems for controlling the condition of air used in preserving produce such as fresh meats, vegetables and fruits.

The general object of the invention is to control the production of refrigerating effect coordinately with the circulation of air as applied to and carried out in an atmosphere wherein produce is stored or handled.

The problem of preserving food products, such as meats, fruits and vegetables, involves a number of factors whose proper coordination sets up a special problem not encountered in carrying out air conditioning processes in the industrial field generally. The produce has a tendency to give off moisture. This moisture, in the case of meats, and some vegetables, for example, must be removed to some degree, otherwise, the surface will become slippery or slimy; or, at times, covered with mold. Yet, if the moisture is removed too fast, the outside tissue or covering will tend to harden. Also, the air circulation must be controlled not only to avoid too rapid evaporation, but also, defeat tendencies to discoloration. In the case of other vegetables and fruits, moisture is also an element whose formation on the outer surface requires removal, to prevent softening, mold formation, soggy conditions, etc. Yet, the removal must not be so rapid that a dry and desiccated condition results.

In addition to moisture removal, the produce must be subjected to air properly refrigerated, whose temperature does not fluctuate more than two or three degrees. For example, in the case of fresh meats, the desirable temperature range is between 30–40 degrees Fahrenheit, but each species of meat requires a specific temperature within said range, and the fluctuation from said specific temperature should not be more than a degree or a degree and a half either side. In the case of fresh vegetables, and fruits, the desirable temperature range is between 31 degrees Fahrenheit and 56 degrees Fahrenheit, but each species or variety of species requires conditioning at a specific temperature within said range, and the fluctuation from said predetermined point should here, too, be limited to a degree or degree and a half. In order that the air at these temperatures be capable of effective preservation of produce, the moisture content with respect to desired temperatures, i. e., the relative humidity, must also be controlled within predetermined limits. Thus, for meats, it is desirable that the relative humidity at temperatures between 30 degrees F. and 40 degrees F., range between 90–85 per cent, depending upon the specific temperature employed. In the case of fresh vegetables, where the temperature range is between 31–56 degrees F., it is desirable that the relative humidity be limited respectively to a range between 90–75 per cent, the specific relative humidity being produced and maintained at a percentage most beneficial for the specific temperature employed; and the same figures apply, generally, in the conditioning of fresh fruits.

It has been found that, in addition to the control of temperature and relative humidity, it is also essential to move or circulate the air throughout the conditioned area. Furthermore, while this movement is highly beneficial under some conditions, it becomes very detrimental under other conditions, especially when the temperature or relative humidity factors are not at the required points (making allowance for negligible fluctuation) for maintaining necessary conditions. For example, if the air assumed a higher temperature than that prescribed, then the relative humidity would tend to fall and descend below the prescribed percentage. Under such conditions, as when the refrigeration is inoperative, which is the case at stated periods under normal operation, an active circulation of air would tend to dry out or desiccate the produce, with detrimental results both to quality and appearance. Therefore, in addition to the control of temperature and relative humidity, applicant coordinates with these factors the control of air motion.

A feature of the invention, therefore, resides in the control of air motion coordinately with the control of temperature and relative humidity in systems for preserving and conditioning produce. Another feature covers a system for governing, automatically, the flow of conditioned air, so that air movement will be assured when the air is at a desired condition, and air movement halted when the condition of the air is unsatisfactory for the preservation of produce.

Further features making for improved methods in the preservation of perishable products will be more apparent from the following description of one form of applicant's invention, in which:

Fig. 1 is a view, in cross-section, of a refrigerator showing, in diagrammatic form, a conditioning unit adapted to be employed in a system for meat preservation, Fig. 2 is a diagrammatic view of an arrangement illustrating one method of controlling air movement in a refrigerator such as that of Fig. 1, and Fig. 3 illustrates a temperature responsive control for operating applicant's fan economizer.

Considering the drawing, similar designations referring to similar parts, numeral 3 represents a refrigerator of orthodox construction, having insulated walls 4, one or more doors 5, and beams 6 for supporting or accommodating produce. In Fig. 1, where a meat refrigerator is particularly illustrated, hooks 7 are shown for hanging carcasses or cuts of beef. In other arrangements, any desired holders or supporting means may be used on which not only meats, but vegetables and fruits may be stored and preserved or conditioned. The construction of the refrigerator or manner of accommodating produce forms no part of this invention, and the figure is intended to be diagrammatic. At the upper part of the refrigerator, adjacent the ceiling level, is suitably mounted an apparatus for supplying refrigerating effect and causing a circulation of air in the refrigerator. Such an apparatus is usually a self-contained unit structure comprising a series of coils to which a refrigerant or refrigerating medium may be supplied directly from the refrigerating machine or a cooler served by an evaporator. A motor driven fan is mounted on the unit, so that the coils, fan, motor and casing structure form a single integral self-contained piece of apparatus adapted to be handled in one unit. This is designated by the numeral 8 in Figs. 1 and 2.

In Fig. 2, the unit 8, which we shall term a cold diffuser, is shown in combination with a refrigerating machine and control means for governing the action of the fan. The refrigeration and control mechanism may be located outside of the refrigerator or otherwise conveniently positioned. The refrigerating machine 9, of suitable design, has a motor 10 for driving compressor 11 which discharges the compressed refrigerant through line 12 into condenser 13, from which the refrigerant in liquid form goes through shut off valve 14 and liquid line 15 to expansion valve 16, and then through the coils 17. The air, in passing through the coils, will cause the usual heat exchange between the heat in the air and the refrigerant, whereby the air will be cooled, and the refrigerant gasefied. Gas line 18 connects the discharge from the evaporator 17 to the compressor. The expansion valve 16, in the arrangement illustrated, is controlled responsive to changes in temperature in the gas or suction line, which is reflected in line 19. This line 19 communicates vapor pressure for operating expansion valve 16 from refrigerant in thermal tube 20, in contact with the suction line 18. The vapor pressure in line 19 will tend to increase or decrease responsive respectively to increases and decreases in temperature in the suction line. Connected with gas line 18 is located a fan economizer unit 21 including switch 22 which controls a circuit for motor 24, arranged to operate fan 25. Push button switch 23 is always on when the system is in operation. As is obvious from the dash-dot wiring diagram, the circuit for operating motor 24 may be completed or broken by the actuation of switch 22. In Fig. 2, the fan economizer 21 responds to changes in the pressure in line 18, which is the vapor pressure of refrigerant in coil 17. As a result, if the pressure should rise, beyond a predetermined point, as would be the case when the refrigeration were cut off, and defrosting completed including evaporation of moisture on the coils, then the control operates to break the contacts in switch 22 and hence, break the electrical circuit to the motor, thus stopping the fan.

In Fig. 3, a temperature responsive control is illustrated for operating applicant's fan economizer. A thermal bulb 26, similar in function and structure to 20 of Fig. 2, is positioned in thermal contact or bond with a tube of the coil 17. As a result, the thermal bulb will reflect the temperature of the refrigerant within the coil and, hence, the surface temperature of the coil. As the temperature rises beyond a predetermined point, which would be the case when the refrigeration were cut off and defrosting completed, including evaporation of moisture on the coils, the vapor pressure of the refrigerant in the thermal bulb 26 would increase to cause switch 22 to open, thus stopping fan 24. The combination of bulb 26, the communicating pressure line and switch 22, shown in Fig. 3, is the equivalent of the fan economizer pressure control generally designated 21 in Fig. 2. When the refrigeration is turned on, the temperature in coil 12 will fall almost immediately to the prescribed level. As a result, this temperature will substantially instantaneously be reflected by a fall in vapor pressure within the line connecting thermal bulb 26 to switch 22 with the result that the contacts will close and the circuit for operating fan 24 be completed.

It is irrelevant whether or not the control 21 operates responsive to changes in temperature or pressure, and applicant makes no limitation with respect to the specific means employed for breaking the circuit for operating the fan whenever conditions in the enclosure indicate that a movement of air is undesirable.

In practice, the refrigerating machine will be started up and thereupon cause a drop in the temperature and pressure in gas line 18 and coil 17. This will be reflected by the control 21. If it is of the temperature responsive type, as in Fig. 3, it will function responsive to the drop in temperature to close the circuit for the fan. If it is of the pressure responsive type, it will similarly operate to close the circuit for the fan. Thus, whenever refrigeration is being supplied, the fan will always operate. Assuming, however, that the refrigeration machine becomes inoperative, then the coils will gradually defrost, i. e., the frost formation on the coils which builds up due to precipitation and freezing as dehumidification is carried on when the refrigerant is below freezing temperature, will gradually begin to melt away. When the melting process is completed, and the wet coils commence to become dry, the refrigerant temperature and corresponding pressure in the suction line and coil 17 will rise precipitately. This will cause the temperature or pressure device 21, as the case may be, to open the switch, so that the fan will immediately become inoperative. As a result, further evaporation from the produce will be minimized and lowering of relative humidity due to circulation of room air, whose temperature is rising because of absence of refrigerating effect, held to a minimum.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

I claim:

1. A method of conditioning the air in a rerigerator, consisting in supplying refrigeration effect to the air within the refrigerator, so that a desired air temperature will be maintained therein, actively circulating air in the refrigerator when the temperature of the refrigerant used is below a predetermined maximum and eliminating the active circulation of air when the temperature of said refrigerant exceeds the predetermined maximum.

2. A method of conditioning the air in an area, consisting in providing refrigeration effect to the air to reduce its temperature below a predetermined maximum, thereby causing a precipitation and freezing of moisture on a heat exchange surface, actively circulating air in the area, and interrupting the active circulation of air subsequent to a cessation of production of refrigerating effect and upon substantially complete deforsting of said frozen precipitate.

3. A method of conditioning air used in refrigerators and the like, consisting in supplying a volatile refrigerant to a cooling surface, circulating air over the surface to provide an active movement thereof in the conditioned area, said refrigerant being vaporized by absorption of heat from said air, and interrupting the circulation of the air when the temperature and corresponding pressure of the vaporized refrigerant circulating proximate said surface rise above predetermined maximum limits.

4. In an apparatus of the character described, a heat interchanger, a fan for circulating air in contact with the heat interchanger, means for supplying refrigerant to the heat interchanger, the discharge of air over the heat interchanger resulting in a frosting of the surfaces thereof due to a precipitation of moisture thereon, and means for causing the fan to become inoperative when the temperature of the surfaces of the heat interchanger rises above the melting point of said frozen precipitate, before heat from the interchanger may cause the temperature in the area served by the system to rise.

5. In an apparatus of the character described, a heat interchanger, a fan for circulating air in contact with the heat interchanger, means for supplying refrigerant to the heat interchanger, the circulation of air over the heat interchanger resulting in a frosting of the surfaces thereof due to a precipitation of moisture thereon, means for interrupting the supply of refrigerant to the heat interchanger, and means for causing the fan to become inoperative upon completion of the defrosting of the heat interchanger subsequent to interruption of the refrigerant supply.

6. A method of conditioning the air in a refrigerator, consisting in supplying a refrigerant to a cooling surface, controlling the supply of refrigerant, actively circulating air over the surface to provide an active movement thereof in the refrigerator, the circulation of air over the surface resulting in the formation of frost thereon, the interruption of said refrigerant supply resulting in the melting of said frost, and causing the active circulation of air to cease upon the substantial completion of said melting subsequent to the interruption of the supply of refrigerant.

7. A method of conditioning the air in an area wherein perishable produce is stored, consisting in supplying refrigerant to a cooling surface, controlling the supply of refrigerant to the surface, circulating air over said cooling surface, the circulation of air causing a precipitation of moisture on the surface, and interrupting the active circulation of air subsequent to the interruption of the supply of refrigerant to the cooling surface and upon completion of the evaporation of the moisture precipitated on the surface.

8. A method of preserving perishable produce, consisting in supplying refrigerant to a heat exchange surface, actively circulating air in contact with said surface, the refrigerant being converted from a liquid to a gas and absorbing heat from said air, controlling the supply of liquid refrigerant to the surface responsive to the condition of the gaseous refrigerant leaving the surface, and interrupting the circulation of air in contact with the surface whenever the temperature or pressure of the gaseous refrigerant leaving the surface rises above a predetermined point.

WILLIAM CARPENDER.